US012234901B2

(12) United States Patent
Lee (10) Patent No.: US 12,234,901 B2
(45) Date of Patent: Feb. 25, 2025

(54) POWER DISTRIBUTION DEVICE

(71) Applicant: HYUNDAI WIA Corporation, Gyeongsangnam-do (KR)

(72) Inventor: Su Whoan Lee, Gyeonggi-do (KR)

(73) Assignee: HYUNDAI WIA CORPORATION (KR)

( * ) Notice: Subject to any disclaimer, the term of this patent is extended or adjusted under 35 U.S.C. 154(b) by 0 days.

(21) Appl. No.: 18/463,065

(22) Filed: Sep. 7, 2023

(65) Prior Publication Data
US 2024/0141975 A1 May 2, 2024

(51) Int. Cl.
*F16H 48/34* (2012.01)
*F16H 48/24* (2006.01)
*B60K 23/08* (2006.01)

(52) U.S. Cl.
CPC .............. *F16H 48/34* (2013.01); *F16H 48/24* (2013.01); *B60K 23/08* (2013.01)

(58) Field of Classification Search
CPC ............ B60K 2023/0841; B60K 23/08; B60K 17/346; B60K 2023/0858; F16H 48/34; F16H 48/24; F16H 48/40
See application file for complete search history.

(56) References Cited

U.S. PATENT DOCUMENTS

| | | | | |
|---|---|---|---|---|
| 5,890,989 A * | 4/1999 | Yamazaki | ............... | B60K 23/08 192/69.82 |
| 6,945,895 B2 * | 9/2005 | Fusegi | ................... | F16H 48/08 192/84.92 |
| 8,287,417 B2 * | 10/2012 | Sudou | ..................... | F16H 48/30 475/231 |
| 8,591,375 B2 * | 11/2013 | Maruyama | ............ | F16D 27/118 192/84.92 |
| 8,597,150 B1 * | 12/2013 | Downs | .................. | F16H 57/029 475/221 |
| 10,308,113 B2 * | 6/2019 | Inose | .................... | B60K 17/165 |
| 10,982,744 B2 * | 4/2021 | Johnson | ............... | B60K 17/346 |
| 11,608,879 B2 * | 3/2023 | Lee | ......................... | F16H 48/40 |
| 2018/0370354 A1 * | 12/2018 | Imafuku | .............. | B60K 17/165 |

FOREIGN PATENT DOCUMENTS

| | | | |
|---|---|---|---|
| DE | 102017200531 A1 | * | 7/2018 |
| JP | S61198754 U | * | 12/1986 |
| JP | 2000118257 A | * | 4/2000 |

* cited by examiner

*Primary Examiner* — Sherry L Estremsky (57) ABSTRACT

Disclosed is a power distribution device, including: a case rotatably provided; a first side gear connected to a first wheel; a second side gear connected to a second wheel; a pinion gear meshed with the first side gear and the second side gear; a cage provided to support the pinion gear and to be capable of relative rotation with respect to the case; a first lock plate contacting and spaced apart from the first side gear such that the first side gear is synchronized and unsynchronized with the case; and a second lock plate contacting and spaced apart from the cage such that the cage is synchronized and unsynchronized with the case. Accordingly, it is possible to improve a size, mountability, weight and cost, and to suppress unintentional release of the lock differential, as the disconnecting function and lock differential function are implemented.

9 Claims, 8 Drawing Sheets

POWER DISTRIBUTION DEVICE

The present application claims priority to Korea Patent Application No. 10-2022-0141563, filed on Oct. 28, 2022, the entire contents of which is incorporated herein for all purposes by this reference.

FIELD

The present disclosure relates to a power distribution device, and more particularly to a power distribution device capable of preventing an all-wheel drive vehicle from becoming unable to run because more and more power is transmitted to wheels having low gripping force and power is not transmitted to wheels having high gripping force, while power is not transmitted to rear wheels during two-wheel drive, but is transmitted to the rear wheels during four-wheel drive.

BACKGROUND

In general, a vehicle is driven by transmitting power generated from a power source such as an engine or a motor to wheels, and the driving method of such a vehicle are divided into a two-wheel drive method that drives only the front or rear wheels and a four-wheel drive method that drives both the front and rear wheels.

The four-wheel drive method has higher driving stability than the two-wheel drive method and is more suitable for driving on rough roads such as mountains. The four-wheel drive method is divided into full time four-wheel drive and two-wheel/four-wheel switching drive.

A power distribution device for distributing power to the front and rear wheels is applied to the two-wheel/four-wheel switching drive method.

The power distribution device includes a disconnecting device for switching between two-wheel drive and four-wheel drive and a lock differential to prevent the vehicle from getting to a state where the vehicle cannot drive during four-wheel drive, since more and more power is transmitted to wheels having low gripping force in the four-wheel drive, and power is not transmitted to wheels having high gripping force.

The disconnecting device is formed of a clutch device having a first disk rotating together with a first shaft and a second disk rotating together with a second shaft and contacting and spaced apart from the first disk.

The lock differential includes a case rotatably provided, a first side gear connected to a first wheel, a second side gear connected to a second wheel, and a pinion gear meshed with the first side gear and the second side gear, and a lock plate contacting and spaced apart from the first side gear such that the first side gear is synchronized and unsynchronized with the case.

Here, the disconnecting device is interposed between the lock differential and an axle device of the vehicle.

In this conventional power distribution device, when the first disk and the second disk are spaced apart, the two-wheel drive is performed, and when the first disk and the second disk come into contact with each other, the four-wheel drive is performed.

In addition, when the lock plate is spaced apart from the first side gear in a state in which the first disk and the second disk are in contact, open differential four-wheel drive is performed. That is, when power is transmitted to the first wheel and the second wheel through the case, the first side gear, and the second side gear, a rotation speed of the first side gear and a rotation speed of the second side gear are compensated to be different from each other, such that the vehicle can turn stably. Here, as the pinion gear revolves along with the case and rotates with respect to a cross shaft, the first side gear and the second side gear may rotate at speeds different from a speed of the case and in addition, rotate at different speeds with respect to each other.

In addition, when the lock plate contacts the first side gear in a state in which the first disk and the second disk are in contact, the locking differential four-wheel drive is performed. That is, when one of the first wheel and the second wheel comes into contact with the ground having a low gripping force, the lock plate comes into contact with the first side gear. Accordingly, when power is transmitted to the first wheel and the second wheel through the case, the first side gear, and the second side gear, as the first side gear and the second side gear are synchronized with the case and rotate at the same speed as the case, the power is transmitted to wheels on the ground with high gripping force, such that the vehicle can drive stably even on the ground with low gripping force. Here, although only the first side gear is in contact with the lock plate, as the pinion gear no longer rotates and only revolves along with the case, the second side gear rotates at the same speed as a speed of the first side gear through the pinion gear.

However, in such a conventional power distribution device, since the disconnecting device and the lock differential had to be provided respectively, there was a problem in that a size, mountability, weight, and cost deteriorated.

In addition, during the all-wheel drive in a state the lock differential is applied to the vehicle, a slip occurs between the first disk and the second disk, so that the lock differential is unintentionally released.

PRIOR ART LITERATURE

Patent Literature

Korea Patent application publication no. 10-2022-0136802

SUMMARY

Accordingly, an object of the present disclosure is to provide a power distribution device capable of improving a size, mountability, weight, and cost while implementing a disconnecting function and a lock differential function.

Another object of the present disclosure is to provide a power distribution device capable of suppressing unintentional release of the lock differential.

One embodiment is a power distribution device, including: a case rotatably provided; a first side gear connected to a first wheel; a second side gear connected to a second wheel; a pinion gear meshed with the first side gear and the second side gear; a cage provided to support the pinion gear and to be capable of relative rotation with respect to the case; a first lock plate contacting and spaced apart from the first side gear such that the first side gear is synchronized and unsynchronized with the case; and a second lock plate contacting and spaced apart from the cage such that the cage is synchronized and unsynchronized with the case.

When the first lock plate is spaced apart from the first side gear and the second lock plate may be spaced apart from the cage, the case and the first lock plate may be unsynchronized with the first side gear, and the case and the second lock plate may be unsynchronized with the cage, such that two-wheel drive is performed.

When the second lock plate contacts the cage, the case and the second lock plate may be synchronized with the cage, such that four-wheel drive is performed.

When the first lock plate is spaced apart from the first side gear, the case and the first lock plate may be unsynchronized with the first side gear, such that open differential four-wheel drive is performed.

When the first lock plate contacts the first side gear, the case and the first lock plate may be synchronized with the first side gear and the second side gear, such that locking differential four-wheel drive is performed.

The first side gear may include a 1-1 spline protruding toward the first lock plate, the first lock plate may include a 1-2 spline meshable with the 1-1 spline, the cage may include a 2-1 spline protruding toward the second lock plate, and the second lock plate may include a 2-2 spline meshable with the 2-1 spline.

The power distribution device may further include: a first actuator fastened to the case and magnetized and demagnetized according to whether a current is applied; a first armature formed integrally with the first lock plate, adsorbed to the first actuator when the first actuator is magnetized, and reciprocating away from the first actuator when the first actuator is demagnetized; a second actuator fastened to the case and magnetized and demagnetized according to whether a current is applied; and a second armature formed integrally with the second lock plate, adsorbed to the second actuator when the second actuator is magnetized, and reciprocating away from the second actuator when the second actuator is demagnetized.

The power distribution device may further include: a first elastic member applying force in a direction separating the first lock plate and the first armature from the first lock plate and the first actuator; and a second elastic member applying force in a direction separating the second lock plate and the second armature from the cage and the second actuator.

The power distribution device may further include: a bearing rotatably supporting the cage with respect to the case.

The first lock plate and the second lock plate may be disposed on opposite sides from each other with respect to the cage.

As the power distribution device according to the present disclosure includes a case rotatably provided; a first side gear connected to a first wheel; a second side gear connected to a second wheel; a pinion gear meshed with the first side gear and the second side gear; a cage provided to support the pinion gear and to be capable of relative rotation with respect to the case; a first lock plate contacting and spaced apart from the first side gear such that the first side gear is synchronized and unsynchronized with the case; and a second lock plate contacting and spaced apart from the cage such that the cage is synchronized and unsynchronized with the case, it is possible to improve a size, mountability, weight and cost while implementing the disconnecting function and lock differential function.

In addition, as the conventional clutch device is replaced with the cage and the second lock plate, unintended release of the lock differential due to slip of the clutch device can be suppressed.

DETAILED DESCRIPTION

Hereinafter, a power distribution device according to the present disclosure will be described in detail with reference to the accompanying drawings.

Figure 1:
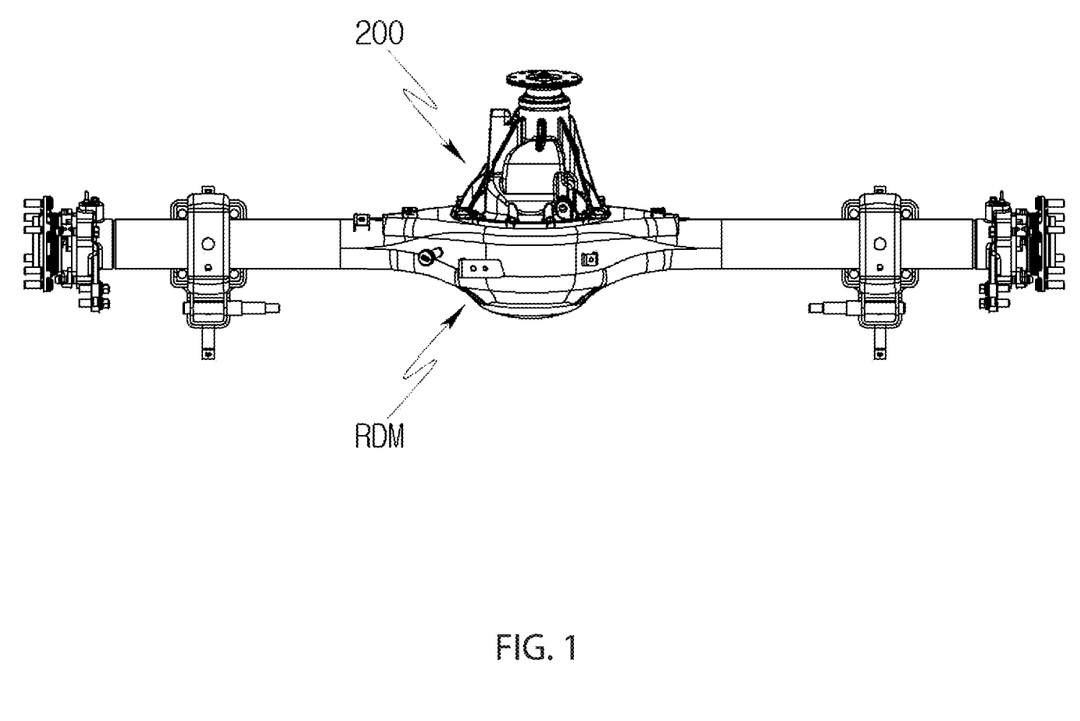
FIG. 1 is a plan view illustrating a part of a vehicle to which a power distribution device according to an embodiment of the present disclosure is applied.
Figure 2:
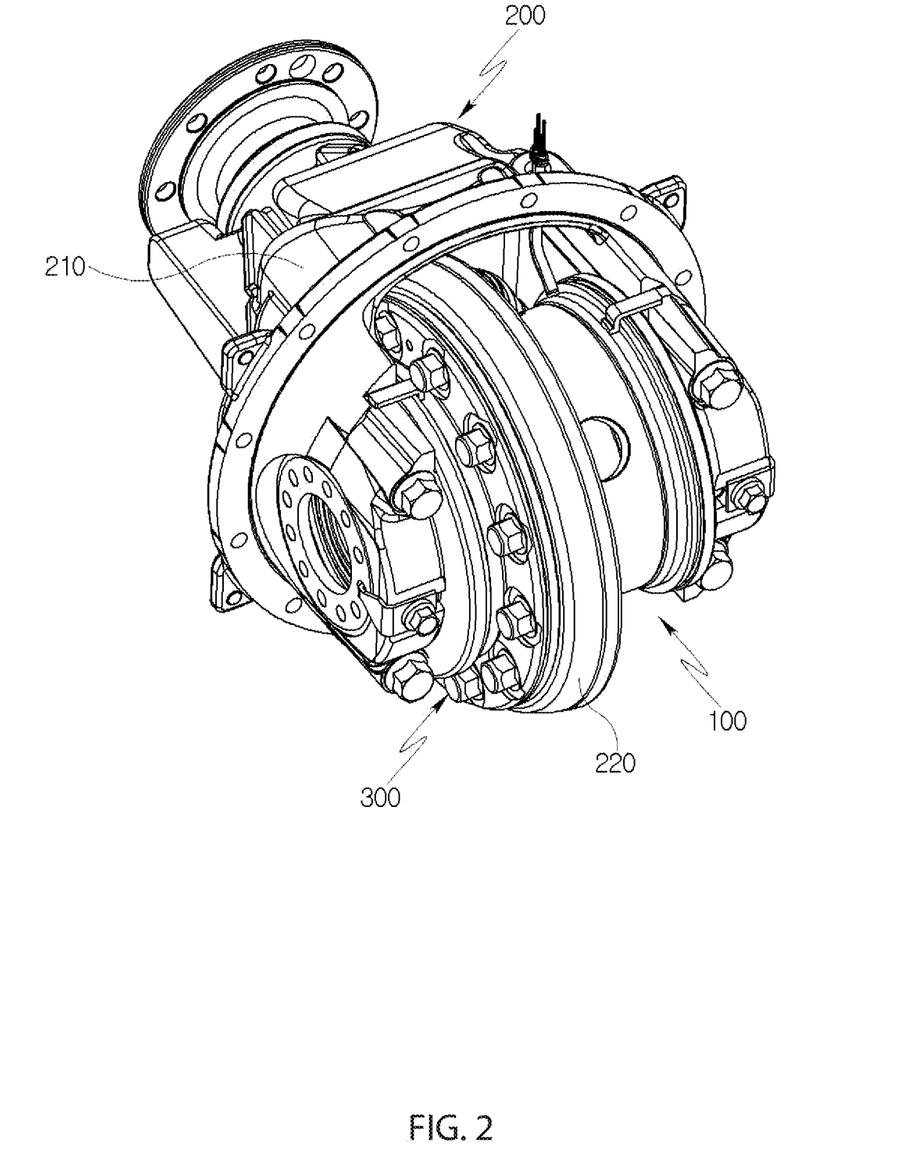
FIG. 2 is a perspective view of a power distribution device of FIG. 1.
Figure 3:
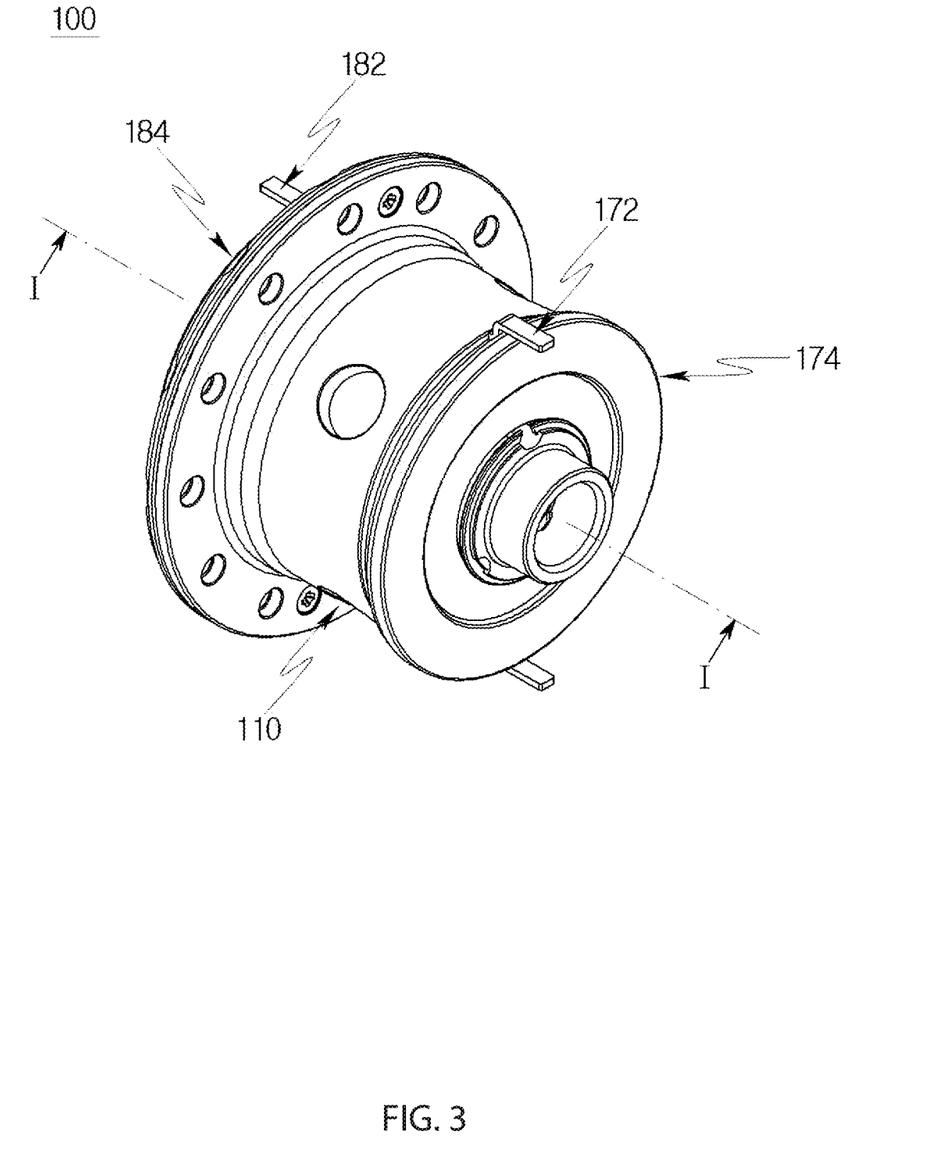
FIG. 3 is a perspective view illustrating a disconnecting lock differential in the power distribution device of FIG. 2.
Figure 4:
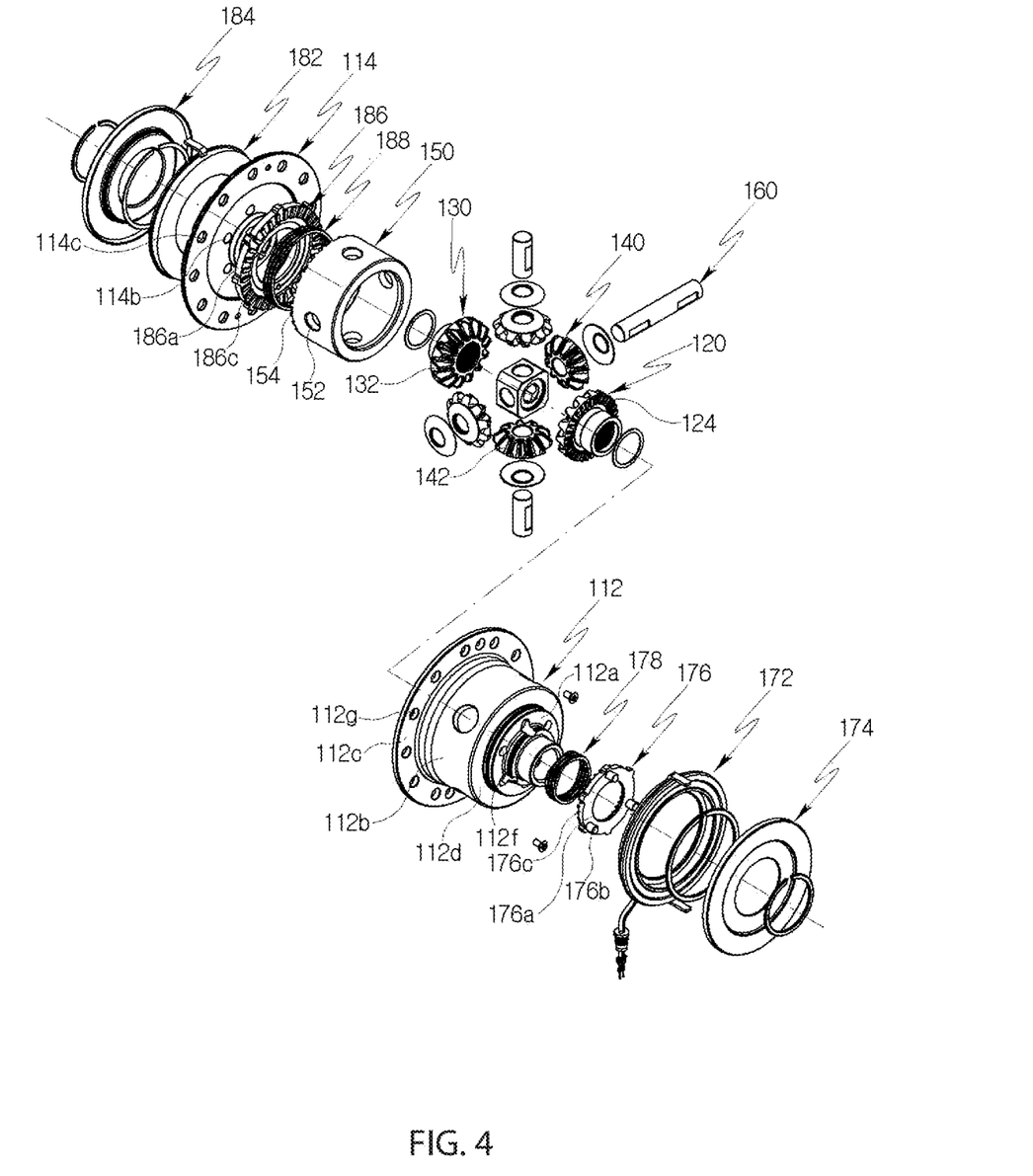
FIG. 4 is an exploded perspective view of FIG. 3.
Figure 5:
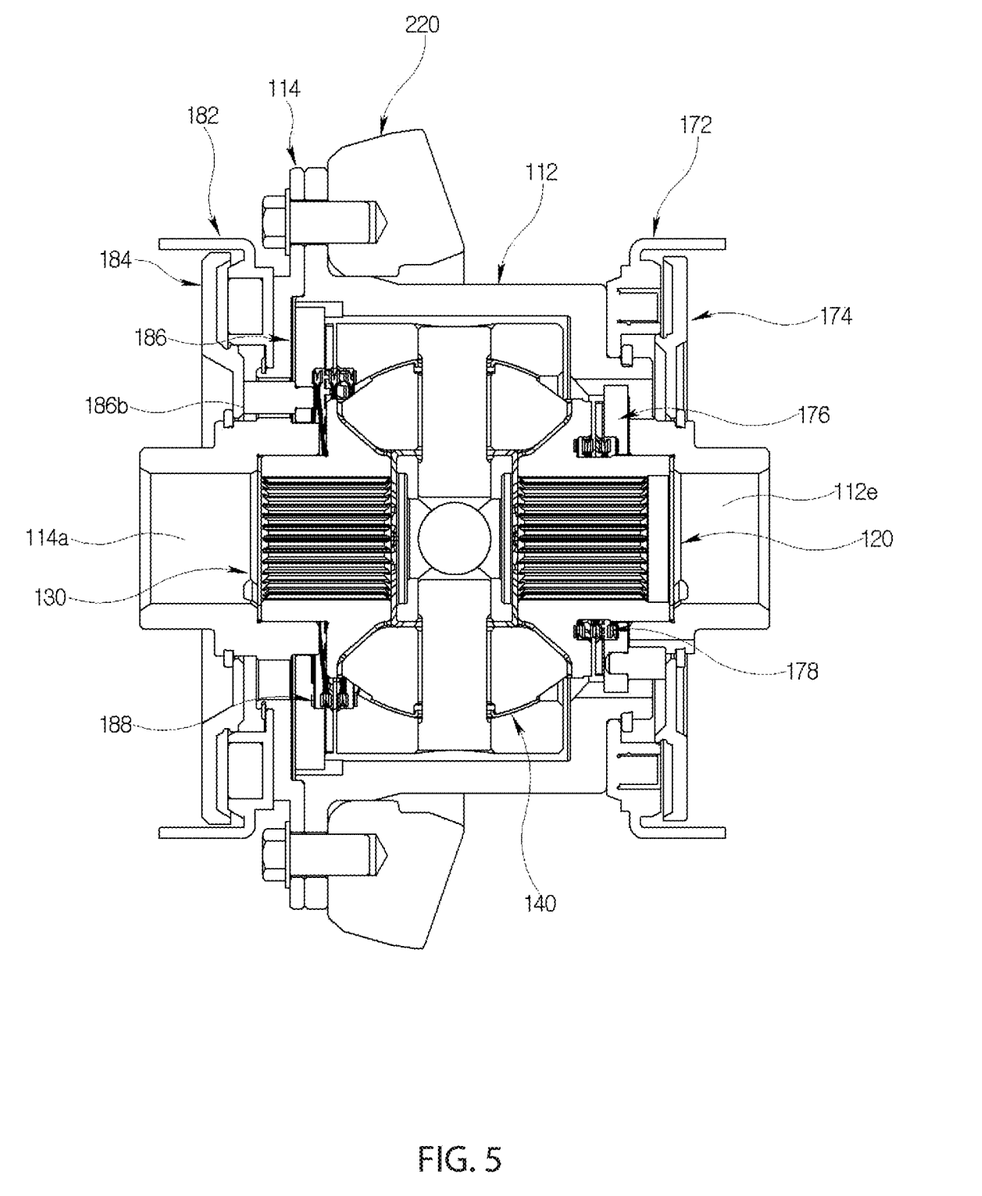
FIG. 5 is a cross-sectional view taken along line I-I in FIG. 3 illustrating a two-wheel drive state.
Figure 6:
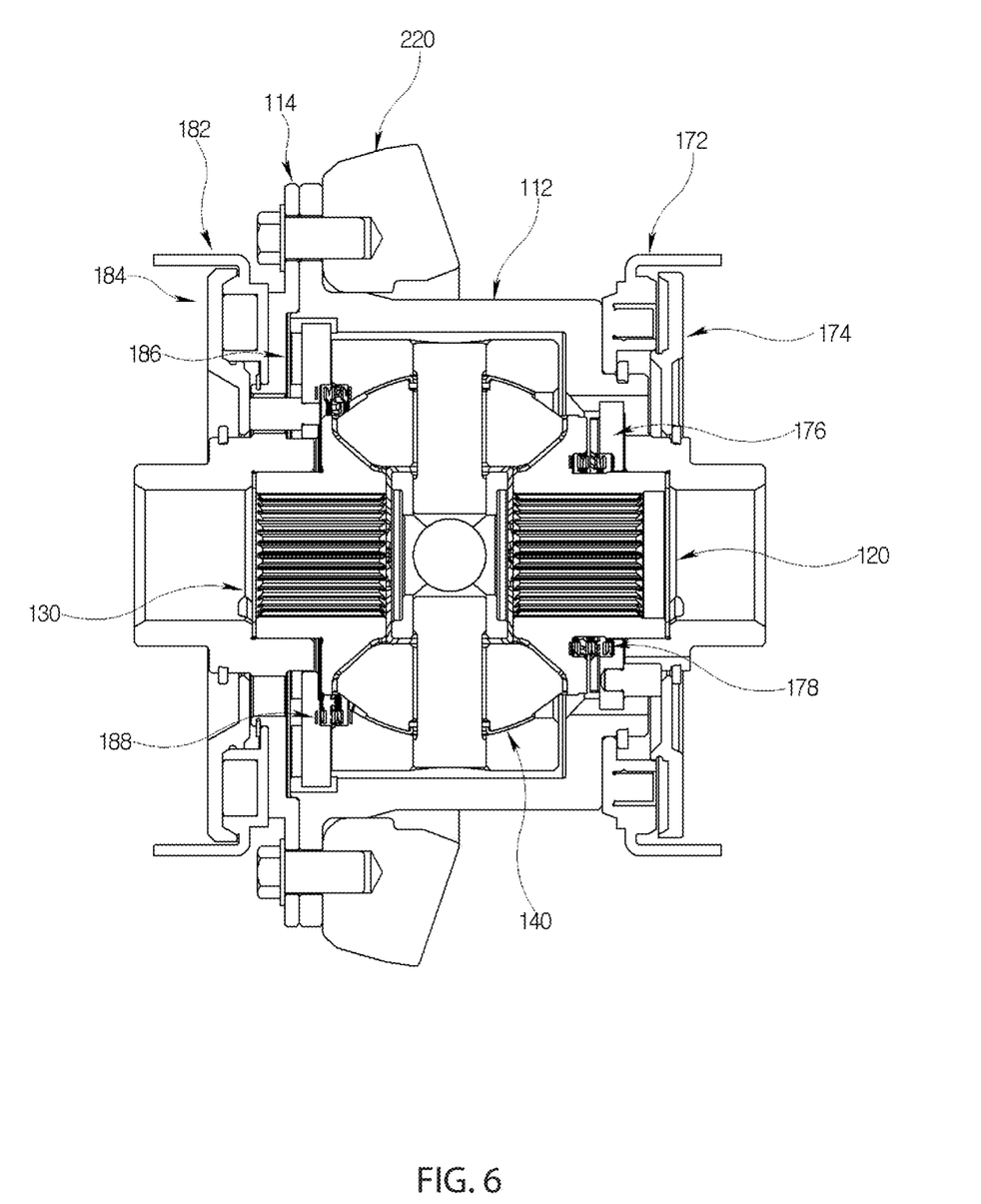
FIG. 6 is a cross-sectional view taken along line I-I in FIG. 3 illustrating an open differential four-wheel drive state.
Figure 7:
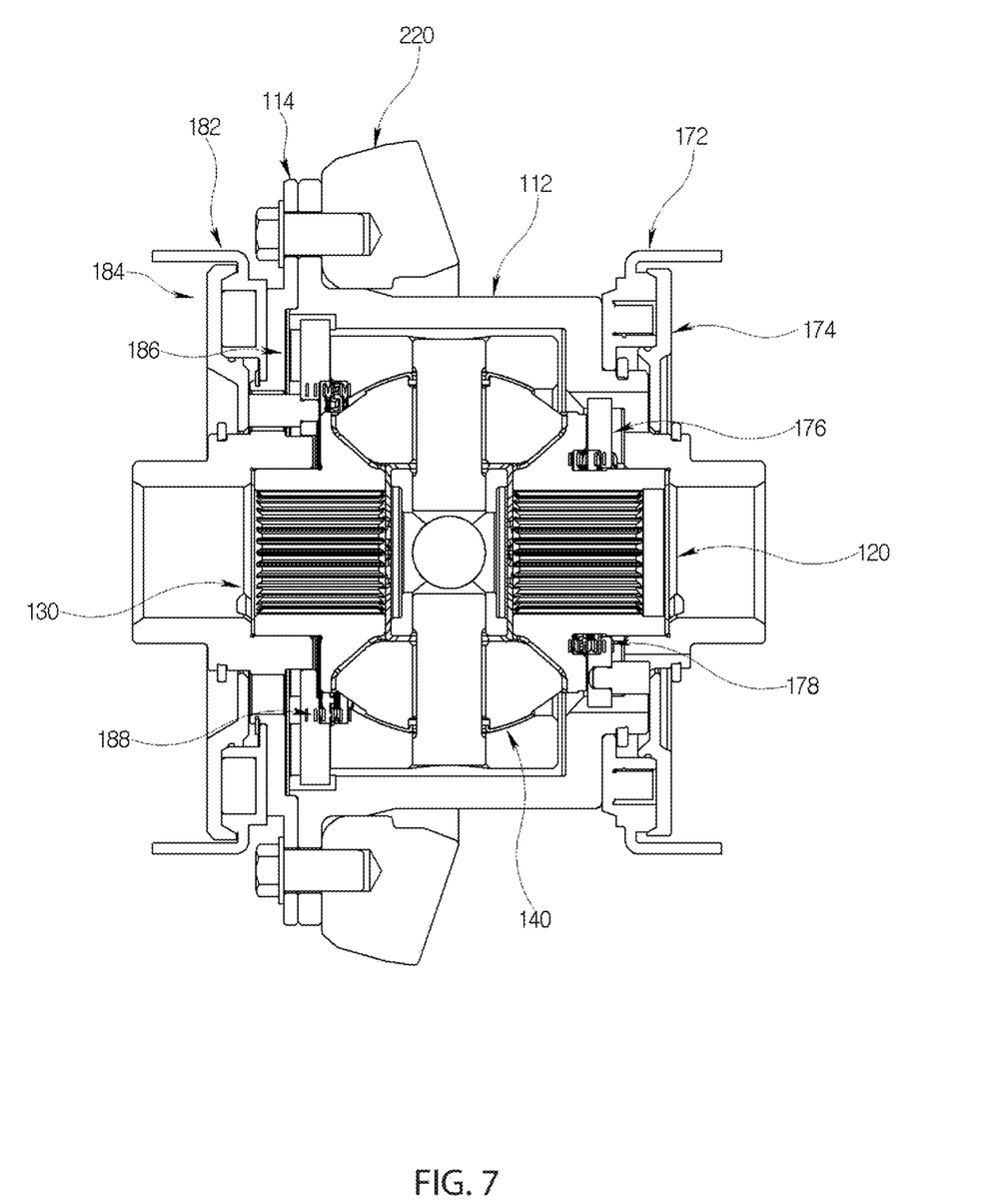
FIG. 7 is a cross-sectional view taken along line I-I in FIG. 3 illustrating a locking differential four-wheel drive state.

FIG. 1 is a plan view illustrating a part of a vehicle to which a power distribution device according to an embodiment of the present disclosure is applied, FIG. 2 is a perspective view of a power distribution device of FIG. 1, FIG. 3 is a perspective view illustrating a disconnecting lock differential in the power distribution device of FIG. 2, FIG. 4 is an exploded perspective view of FIG. 3, FIG. 5 is a cross-sectional view taken along line I-I in FIG. 3 illustrating a two-wheel drive state, FIG. 6 is a cross-sectional view taken along line I-I in FIG. 3 illustrating an open differential four-wheel drive state, and FIG. 7 is a cross-sectional view taken along line I-I in FIG. 3 illustrating a locking differential four-wheel drive state.

Referring to FIGS. 1 through 7, a power distribution device according to an embodiment of the present disclosure may include a disconnecting lock differential 100 for implementing a disconnecting function and lock differential function and a connecting device 200 for connecting the disconnecting lock differential device 100 to, for example, a rear differential module (RDM) and a drive shaft (not illustrated) of a vehicle.

The disconnecting lock differential 100 may include a case 110 rotatably provided, a first side gear 120 connected to a first wheel, a second side gear 130 connected to a second wheel, a pinion gear 140 meshed with the first side gear 120 and the second side gear 130, a cage 150 provided to support the pinion gear 140 and to be capable of relative rotation with respect to the case 110, a first actuator 172 fastened to the case 110 and magnetized and demagnetized according to whether a current is applied, a first armature 174 reciprocating in a direction approaching and moving away from the first actuator 172, a first lock plate 176 reciprocating together with the first armature 174 and contacting and spaced apart from the first side gear 120, a second actuator 182 fastened to the case 110 and is magnetized and demagnetized according to whether a current is applied, a second armature 184 reciprocating in a direction approaching and moving away from the second actuator 182, and a second lock plate 186 disposed opposite to the first lock plate 176 with respect to the case 150, reciprocating with the second armature 184 and contacting and spaced apart from the cage.

The case 110 includes the first side gear 120, the second side gear 130, the pinion gear 140, the cage 150, a cup 112 having a space accommodating the first lock plate 176 and the second lock plate 186, and a cover 114 fastened to the cup 112 to cover an opening of the accommodating space.

The cup 112 includes an end plate 112a formed in a substantially disk shape, an annular wall portion 112b protruding from an outer circumferential portion of the end plate 112a toward the cover 114, a flange portion 112c extending radially outward from a front end of the annular wall portion 112b, a first recess 112d formed in an intaglio on an outer circumferential surface of a portion connecting between the end plate 112a and the annular wall portion 112b such that the first actuator 172 can be mounted thereto.

A first shaft bearing hole 112e through which a first shaft connecting the first side gear 120 and the first wheel passes is formed at a center of the end plate 112a, and a first through-hole 112f through which a first push rod portion 176b, which will be described later, passes is formed at a position radially spaced apart from the first shaft bearing hole 112e.

Here, the first shaft bearing hole 112e is formed to pass through the end plate 112a along a rotation axis of the case 110, and the first through-hole 112f is formed to pass through the end plate 112a along a direction parallel to the rotation axis of the case 110.

A first fastening hole 112g into which a fastening member 300 fastening the cup 112, the cover 114, and a drive gear 220 to be described later are inserted may be formed in the flange portion 112c.

The cover 114 is formed in a substantially disk shape, a second shaft bearing hole 114a through which a second shaft connecting the second side gear 130 and the second wheel to pass is formed at a center of the cover 114, and a second through-hole 114b through which a second push rod portion 186b to be described later passes is formed at a position radially spaced apart from the first shaft bearing hole 112e.

In addition, a second fastening hole 114c into which the fastening member 300 is inserted is formed on an outer circumference of the cover 114, and a second recess 114d in which the second actuator 182 is mounted is formed at a position radially spaced apart from the second fastening hole 114c.

Here, the second shaft hole 114a is formed to penetrate the cover 114 along the rotation axis of the case 110 and the second through-hole 114b is formed to pass through the end plate 112a along a direction parallel to the rotation axis of the case 110.

The first side gear 120 is formed to rotate coaxially with the rotation axis of the case 110, and may include a first tooth 122 formed on a portion opposite to the cover 114, and a 1-1 spline 124 formed on a portion opposite to the end plate 112a of the cup 112.

The second side gear 130 is formed to rotate coaxially with the rotation axis of the case 110 and with a rotation axis of the first side gear 120 at a position opposite to the first side gear 120, and includes a second tooth 132 formed at a position opposite to the first side gear 120.

The pinion gear 140 is formed to rotate with respect to the cross shaft 160 and revolve with respect to the rotation axis of the case 110, and may include a third tooth 142 tooth meshed with the first tooth 122 on one side thereof and tooth meshed with the second tooth 132 on another side thereof.

The cage 150 is formed in an annular shape extending along a revolution direction of the pinion gear 140, and may include a third through-hole 152 that passes through the cage 150 along a radial direction of the cage 150 such that the cross shaft 160 is inserted therein.

In addition, the case 150 may include a 2-1 spline 154 formed at a position opposite to the cover 114.

The first actuator 172 may include an electromagnet that is magnetized when a current is applied thereto and demagnetized when a current is not applied thereto.

The first armature 174 is formed in an annular shape extending along the rotation direction of the case 110 centering around about the first shaft bearing hole 112e of the case 110, and an inner circumferential portion of the first armature 174 may be fastened to the first push rod portion 176b to be described later, and an outer circumferential portion thereof may face the first actuator 172.

The first lock plate 176 may include an annular first plate portion 176a extending along an outer circumferential portion of the first side gear 120 between the first side gear 120 and the end plate 112a of the cup 112, and the first push rod portion 176b protruding from the first plate portion 176a toward the end plate 112a and passing through the first through-hole 112f to be fastened to the inner circumferential portion of the first armature 174, and the first plate portion 176a may include a 1-2 spline 176c meshable with the 1-1 spline 124.

Here, the first plate portion 176a may have a thickness smaller than a distance between the first side gear 120 and the end plate 112a such that the first plate portion 176a can reciprocate between the first side gear 120 and the end plate 112a in a direction of the rotation axis of the case 110.

In addition, a first elastic member 178 is provided between the first side gear 120 and the first lock plate 176 to apply elastic force to move the first lock plate 176 toward the end plate 112a.

The second actuator 182 may include an electromagnet that is magnetized when a current is applied thereto and demagnetized when a current is not applied thereto.

Here, the second actuator 182 may be formed to be operated independently from the first actuator 172.

The second armature 184 is formed in an annular shape extending along the rotation direction of the case 110 centering around about the second shaft bearing hole 114a of the case 110, and an inner circumferential portion of the second armature 184 may be fastened to the second push rod portion 186b to be described later, and an outer circumferential portion thereof may face the second actuator 182.

The second lock plate 186 may include an annular second plate portion 186a extending along the case 150 between the cage 150 and the cover 114, and the second push rod portion 186b protruding from the second plate portion 186a toward the cover 114 and passing through the second through-hole 114b to be fastened to the inner circumferential portion of the second armature 184, and the second plate portion 186a may include a 2-2 spline 186c meshable with the 2-1 spline 154.

Here, the second plate portion 186a may have a thickness smaller than a distance between the cage 150 and the cover 114 such that the second plate portion 186a can reciprocate between the cage 150 and the cover 114 in a direction of the rotation axis of the case 110.

In addition, a second elastic member 188 is provided between the cage 150 and the second lock plate 186 to apply elastic force to move the second lock plate 186 toward the cover 114.

The connecting device 200 includes a housing 210 accommodating the disconnecting lock differential 100 and fastened to the rear differential module (RDM), and a drive gear 220 rotatably provided in the housing 210, and the drive gear 220 is connected to the drive shaft (not illustrated) on one side of the connecting device 200 and to the case 110 on the other side thereof.

Hereafter, the operational effect produced by the power distribution device according to the present embodiment will be described.

First, referring to FIG. 5, in the case of the two-wheel drive mode, the current may not be applied to the second actuator 182. Then, no attractive force is generated between the second actuator 182 and the second armature 184, and the second lock plate 186 may be moved toward the cover 114 by the second elastic member 188 and may not come into contact with the cage 150. That is, the 2-1 spline 154 and the 2-2 spline 186c may not mesh with each other. Also, the second armature 184 may be moved together with the second lock plate 186 to be spaced apart from the second actuator 182. Accordingly, the case 110 and the second lock plate 186 may be unsynchronized with the cage 150.

Also, in the two-wheel drive mode, the current may not be applied to the first actuator 172. Then, no attractive force is generated between the first actuator 172 and the first armature 174, and the first lock plate 176 may be moved toward the end plate 112a by the first elastic member 178 and may not come into contact with the first side gear 120. That is, the 1-1 spline 124 and the 1-2 spline 176c may not mesh with each other. Also, the first armature 174 may be moved together with the first lock plate 176 to be spaced apart from the first actuator 172. Accordingly, the case 110 and the first lock plate 176 may be unsynchronized with the first side gear 120.

In this disconnected state, as the rear wheels (first wheel and second wheel), the first side gear 120, the second side gear 130, the pinion gear 140, and the cage 150 can be moved independently with respect to the case 110, the power generated from the power source is transmitted only to the front wheels without being transmitted to the rear wheels (first wheel, second wheel), and the vehicle can be driven with two wheels.

Here, since the case 110, the drive gear 220, and the drive shaft (not illustrated) do not rotate, power loss may be reduced.

Next, referring to FIGS. 6 and 7, in the case of the four-wheel drive mode, a current may be applied to the second actuator 182. Then, an attractive force is generated between the second actuator 182 and the second armature 184. Then, the second armature 184 may be moved toward the second actuator 182 and adsorbed to the second actuator 182. Also, the second lock plate 186 may be moved together with the second armature 184 to come into contact with the cage 150. That is, the 2-1 spline 154 and the 2-2 spline 186c may mesh with each other. Accordingly, the case 110 and the second lock plate 186 are synchronized with the cage 150, such that the cage 150 can be rotated at the same speed as the case 110. In this connected state, the power generated from the power source is transmitted to the rear wheels (first wheel and second wheel) as well as the front wheels, such that the vehicle can be driven by all four wheels.

Here, in the four-wheel drive mode, as illustrated in FIG. 6, a current may not be applied to the first actuator 172. Then, no attractive force is generated between the first actuator 172 and the first armature 174, and the first lock plate 176 may be moved toward the end plate 112a by the first elastic member 178 and may not come into contact with the first side gear 120. That is, the 1-1 spline 124 and the 1-2 spline 176c may not mesh with each other. Also, the first armature 174 may be moved together with the first lock plate 176 to be spaced apart from the first actuator 172. Accordingly, the case 110 and the first lock plate 176 may be unsynchronized with the first side gear 120. In this open differential four-wheel drive mode, when the power is transmitted to the rear wheels (first wheel and second wheel) through the case 110, the first side gear 120, and the second side gear 130, the rotation speed of the first side gear 120 and the rotation speed of the second side gear 130 are compensated to be different from each other, such that the vehicle can turn stably.

Alternatively, in the four-wheel drive mode, as illustrated in FIG. 7, a current may be applied to the first actuator 172 to generate an attractive force between the first actuator 172 and the first armature 174. Then, the first armature 174 may be moved toward the first actuator 172 and adsorbed to the first actuator 172. Also, the first lock plate 176 may be moved together with the first armature 174 to come into contact with the first side gear 120. That is, the 1-1 spline 124 and the 1-2 spline 176c may mesh with each other. Accordingly, the first side gear 120 is synchronized with the case 110 through the first lock plate 176, the first armature 174 and the first actuator 172, and the second side gear 130 is synchronized with the first side gear 120 through the pinion gear 140, such that the first side gear 120 and the second side gear 130 can be rotated at the same speed as the case 110. In this locking differential four-wheel drive mode, when power is transmitted to the first wheel and the second wheel through the case 110, the first side gear 120, and the second side gear 130, the power is delivered to wheels on the ground with a relatively high gripping force, thereby the vehicle can be driven stably even on rough terrain.

Here, as the disconnecting device according to the present embodiment includes the first lock plate 176 and the second lock plate 186, a disconnecting function and a lock differential function can be implemented with the disconnecting lock differential device 100. Accordingly, the size, mountability, weight, and cost of the disconnecting device may be improved.

In addition, as the conventional clutch device is replaced with the cage 150 and the second lock plate 186 meshable with each other, unintentional release of the lock differential due to slip of the clutch device can be suppressed.

Figure 8:
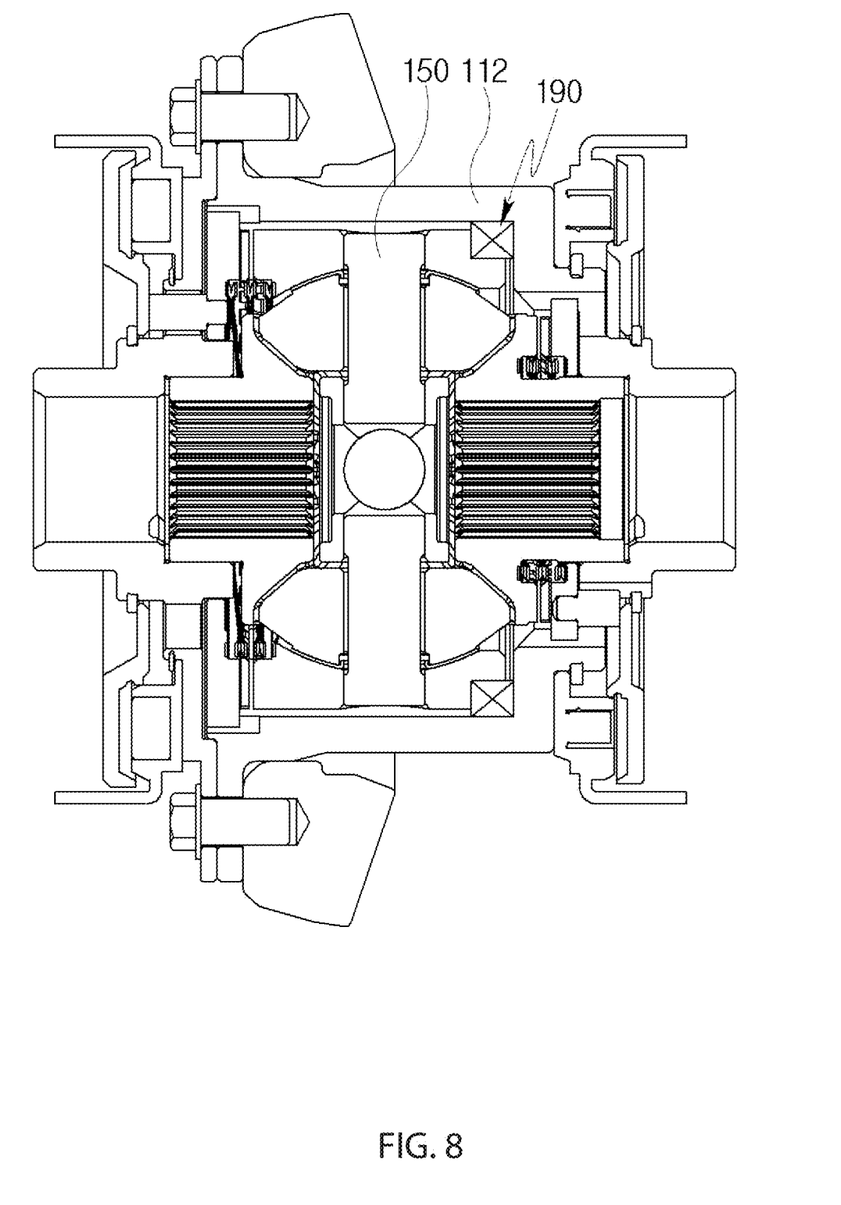
FIG. 8 is a cross-sectional view of a power distribution device according to another embodiment of the present disclosure.

Meanwhile, in order to improve durability, as illustrated in FIG. 8, a bearing 190 rotatably supporting the cage 150 with respect to the case 110 may be provided between the case 110 and the cage 150.

REFERENCE NUMERALS

110: case
120: first side gear
124: 1-1 spline
130: second side gear
140: pinion gear
150: cage
154: 2-1 spline
172: first actuator
174: first armature
176: first lock plate
176c: 1-2 spline
178: first elastic member
182: second actuator
184: second armature
186: second lock plate
186c: 2-2 spline
188: second elastic member
190: bearing

What is claimed is:

1. A power distribution device, comprising:
   a case rotatably provided;
   a first side gear connected to a first wheel;
   a second side gear connected to a second wheel;
   a pinion gear meshed with the first side gear and the second side gear;
   a cage provided to support the pinion gear and to be capable of relative rotation with respect to the case;
   a first lock plate contacting and spaced apart from the first side gear such that the first side gear is synchronized and unsynchronized with the case;
   a second lock plate contacting and spaced apart from the cage such that the cage is synchronized and unsynchronized with the case;
   a first actuator fastened to the case and magnetized and demagnetized according to whether a current is applied;
   a first armature formed integrally with the first lock plate, adsorbed to the first actuator when the first actuator is magnetized, and reciprocating away from the first actuator when the first actuator is demagnetized;
   a second actuator fastened to the case and magnetized and demagnetized according to whether a current is applied; and
   a second armature formed integrally with the second lock plate, adsorbed to the second actuator when the second actuator is magnetized, and reciprocating away from the second actuator when the second actuator is demagnetized.

2. The power distribution device of claim 1,
   wherein when the first lock plate is spaced apart from the first side gear and the second lock plate is spaced apart from the cage, the case and the first lock plate are unsynchronized with the first side gear, and the case and the second lock plate are unsynchronized with the cage, such that two-wheel drive is performed.

3. The power distribution device of claim 1,
   wherein when the second lock plate contacts the cage, the case and the second lock plate are synchronized with the cage, such that four-wheel drive is performed.

4. The power distribution device of claim 3,
   wherein when the second lock plate contacts the cage and the first lock plate is spaced apart from the first side gear, the case and the first lock plate are unsynchronized with the first side gear, such that open differential four-wheel drive is performed.

5. The power distribution device of claim 3,
   wherein when the second lock plate contacts the cage and the first lock plate contacts the first side gear, the case and the first lock plate are synchronized with the first side gear and the second side gear, such that locking differential four-wheel drive is performed.

6. The power distribution device of claim 1,
   wherein the first side gear comprises a 1-1 spline protruding toward the first lock plate,
   the first lock plate comprises a 1-2 spline meshable with the 1-1 spline,
   the cage comprises a 2-1 spline protruding toward the second lock plate, and
   the second lock plate comprises a 2-2 spline meshable with the 2-1 spline.

7. The power distribution device of claim 1, further comprising:
   a first elastic member applying force in a direction separating the first lock plate and the first armature from the first side gear and the first actuator; and
   a second elastic member applying force in a direction separating the second lock plate and the second armature from the cage and the second actuator.

8. The power distribution device of claim 1, further comprising:
   a bearing rotatably supporting the cage with respect to the case.

9. The power distribution device of claim 1,
   wherein the first lock plate and the second lock plate are disposed on opposite sides from each other with respect to the cage.

* * * * *